US008219839B2

(12) United States Patent
Akimoto (10) Patent No.: US 8,219,839 B2
(45) Date of Patent: Jul. 10, 2012

(54) POWER DISTRIBUTION SYSTEM AND METHOD THEREOF IN WHICH REDUNDANT POWER IS COLLECTED ONLY WHEN POWER POOL IS BELOW OR EQUAL TO POOL THRESHOLD

(75) Inventor: Shunsuke Akimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 230 days.

(21) Appl. No.: 12/706,492

(22) Filed: Feb. 16, 2010

(65) Prior Publication Data

US 2010/0211807 A1     Aug. 19, 2010

(30) Foreign Application Priority Data

Feb. 17, 2009   (JP) ............................... P2009-034051

(51) Int. Cl.
*G06F 1/26*         (2006.01)
(52) U.S. Cl. ........................................ 713/320; 713/300
(58) Field of Classification Search .................. 713/300, 713/320
See application file for complete search history.

(56) References Cited

U.S. PATENT DOCUMENTS

| | | | | |
|---|---|---|---|---|
| 7,467,306 | B2 * | 12/2008 | Cartes et al. | 713/300 |
| 7,793,126 | B2 * | 9/2010 | McGrane et al. | 713/320 |
| 7,831,843 | B2 * | 11/2010 | Brundridge et al. | 713/300 |
| 7,984,311 | B2 * | 7/2011 | Brumley et al. | 713/300 |
| 7,996,690 | B2 * | 8/2011 | Shetty et al. | 713/300 |
| 8,046,600 | B2 * | 10/2011 | Holle et al. | 713/300 |
| 2007/0260897 | A1 * | 11/2007 | Cochran et al. | 713/300 |
| 2008/0077817 | A1 * | 3/2008 | Brundridge et al. | 713/340 |
| 2008/0155284 | A1 * | 6/2008 | Shimohata et al. | 713/300 |
| 2009/0077407 | A1 * | 3/2009 | Akimoto | 713/340 |

FOREIGN PATENT DOCUMENTS

| | | |
|---|---|---|
| JP | 11-259185 A | 9/1999 |
| JP | 2001312337 A | 11/2001 |
| JP | 2002136000 A | 5/2002 |
| JP | 2004215351 A | 7/2004 |
| JP | 2006-011793 A | 1/2006 |
| JP | 2006-195986 A | 7/2006 |
| JP | 2007-287150 A | 11/2007 |
| JP | 2007310791 A | 11/2007 |
| JP | 2008083841 A | 4/2008 |
| JP | 2008160971 A | 7/2008 |

OTHER PUBLICATIONS

Japanese Office Action for JP2009-034051 dated Jan. 25, 2011.
Japanese Notice of Allowance for JP2009-034051 mailed Apr. 12, 2011.

* cited by examiner

*Primary Examiner* — Chun Cao (57) ABSTRACT

A power distribution system is adapted to a management module connected to a plurality of servers, each of which is varied in power consumption in response to a power mode and performance thereof, via a power allocation request line and a power allocation response line. The management module records the upper-limit power setting, the power allocations, and the power pool with regard to the servers. The server records the power mode, the power allocation, the upper mode request threshold, and the redundant power which is calculated based on the difference between the power allocation and the actual power consumption. The management module recovers the redundant power from the server so as to update the power pool. Upon receiving a power allocation request, the management module distributes at least a part of the power pool to the server, thus allowing the server to shift the power mode to the upper mode.

4 Claims, 7 Drawing Sheets

POWER MODE MANAGEMENT TABLE 212

| POWER MODE | MAXIMUM POWER | UPPER MODE REQUEST THRESHOLD | PROCESSOR FREQUENCY | PROCESSOR VOLTAGE | MEMORY BAND | I/O BAND | DISK REVOLVING SPEED |
|---|---|---|---|---|---|---|---|
| MODE 1 | 100W | 80W | 1.6GHz | 0.9V | 20% | 20% | 20% |
| MODE 2 | 200W | 160W | 1.6GHz | 1.2V | 50% | 50% | 50% |
| . | . | . | . | . | . | . | . |
| MODE n | 1000W | — | 3.4GHz | 3.3V | 100% | 100% | 100% |

LOWER MODE ←→ UPPER MODE

POWER DISTRIBUTION SYSTEM AND METHOD THEREOF IN WHICH REDUNDANT POWER IS COLLECTED ONLY WHEN POWER POOL IS BELOW OR EQUAL TO POOL THRESHOLD

The present application claims priority on Japanese Patent Application No. 2009-34051, the content of which is incorporated herein by reference.

FIELD OF THE INVENTION

The present invention relates to power distribution systems and methods for allocating electric power to information processing apparatuses within limited available electricity.

DESCRIPTION OF THE RELATED ART

In computer systems, limited available electricity is shared and allocated to servers in such a way that power allocations which are not currently used in servers are pooled as reserve power, which are appropriately and rapidly allocated to other servers requiring power.

Power distribution systems may hardly follow up with rapidly increasing power consumptions exploited in information-technology (IT) apparatuses because of insufficient installation environments and delayed budget allotments with regard to electrical facilities. It is a pressing need to develop sophisticated power distribution systems to cope with insufficient installation environments of IT apparatuses and limited available electricity.

For this reason, various technologies have been developed with respect to power management systems adapted to computers and information processing apparatuses.

Patent Document 1: Japanese Patent Application Publication No. 2006-11793
Patent Document 2: Japanese Patent Application Publication No. 2006-195986

The power management systems disclosed in Patent Documents 1 and 2 need a long time for allocating power to information processing apparatuses. Delayed power allocation may cause unwanted processing losses due to rapid variations of power caused by information processing apparatuses. Inefficient power allocation may degrade the entire system performance.

Presumably, the overall time required for processing power allocations tends to increase due to the following problems.

(1) Every time each server requests a power allocation, it is necessary to limit the allocated power of another server (already sufficing its operation) so as to reserve a redundant power.
(2) It is necessary to perform negotiations over power distributions via networks such as local area networks (LAN).

SUMMARY

The present invention seeks to solve the above problems, or to improve upon the problems at least in part.

The present invention is directed to a power distribution system and method adapted to a management module connected to a plurality of information processing apparatuses (e.g. servers), each of which is varied in power consumption in response to a power mode and performance thereof, via a network.

As to the problem (1), the present invention recovers the redundant power from servers in advance by way of the power pool so that the necessary amount of power can be immediately distributed to each server upon receiving a power allocation request. Herein, the server normally monitors and updates the redundant power corresponding to the difference between the power allocation and the actual power consumption thereof, thus enabling the management module to recover the redundant power at any time. The management module is able to designate the server for recovering its redundant power on the basis of the predetermined priority or in light of the predetermined policy in which the management module does not recover the redundant power for a certain time period, thus coping with load variations.

As to the problem (2), the present invention introduces hard-wired interrupt lines (e.g. a power allocation request line and a power allocation response line laid between the management module and the server), so as to reduce the overall time required for processing power allocations. Specifically, the server uses the power allocation request line to interrupt the management module upon requesting a power allocation thereto. The management module uses the power allocation response line to accept or reject the power allocation request by way of "acknowledge (Ack)" or "Non-Acknowledge (Nak)". Upon receiving the power allocation request, the management module determines whether or not the power pool thereof suffices the maximum power requested by the server, thus returning "Ack/Nak" to the server. Thus, the server receiving "Ack" is able to exploit the power pool of the management module.

The present invention demonstrates the following effects.

(1) The management module is designed to arbitrarily recover redundant power and to reserve the power pool by way of the background operation in connection with the servers, so that an adequate amount of power can be immediately retrieved from the power pool and distributed to the server upon receiving a power allocation request. This eliminates the necessity of performing complicated procedures in which upon receiving a power allocation from a certain server, the management module retrieves power allocations from other servers; hence, it is possible to reduce the overall time required for processing power allocations to servers.

(2) It is possible to significantly reduce the overall time required for processing power allocations to servers by use of communication lines exclusively used for transmitting power allocation requests and responses between the management module and servers.

(3) Due to the above effects (1) and (2), it is possible to reduce the time required for processing power allocation to a front-end server (e.g. a WEB server), which presumably undergoes rapid load variations, thus roughly eliminating the performance loss caused by the time-consuming power allocation processing.

(4) The present invention does not allow the management module to recover redundant power from servers when the power pool exceeds the pool threshold. This prevents the management module from excessively recovering redundant power from servers even when the power pool adequately suffices the total power consumption made by grouped servers. This also prevents servers from being degraded in performance due to unnecessary limitations imposed on functions of servers.

(5) Using the power allocation request/response lines each configured of multiple bits, the management module is able to perform fine adjustment on power allocations to servers, since the power allocation to each server is not necessarily controlled in simple on/off states. This contributes to a reduction of the time required by each server shifting its power mode to an optimum mode.

(6) Through adjusting the power monitor time in which the server monitors the actual power consumption for the purpose of calculating the redundant power, it is possible to designate an optimum policy, which allows the management module to recover redundant power from each server in response to its job, in a flexible manner For example, the power monitor time is increased with respect to a database server, which does not undergo large power variations, so as to prevent the power allocation from being frequently retrieved in response to subtle power variations. Alternatively, the power monitor time is decreased with respect to a WEB server, which readily undergoes power variations, so as to efficiently recover redundant power.

BRIEF DESCRIPTION OF THE DRAWINGS

The above features and advantages of the present invention will be more apparent from the following description of certain preferred embodiments taken in conjunction with the accompanying drawings.

DESCRIPTION OF THE PREFERRED EMBODIMENT

The present invention will be now described herein with reference to illustrative embodiments. Those skilled in the art will recognize that many alternative embodiments can be accomplished using the teachings of the present invention and that the invention is not limited to the embodiments illustrated for explanatory purposes.

Figure 1:
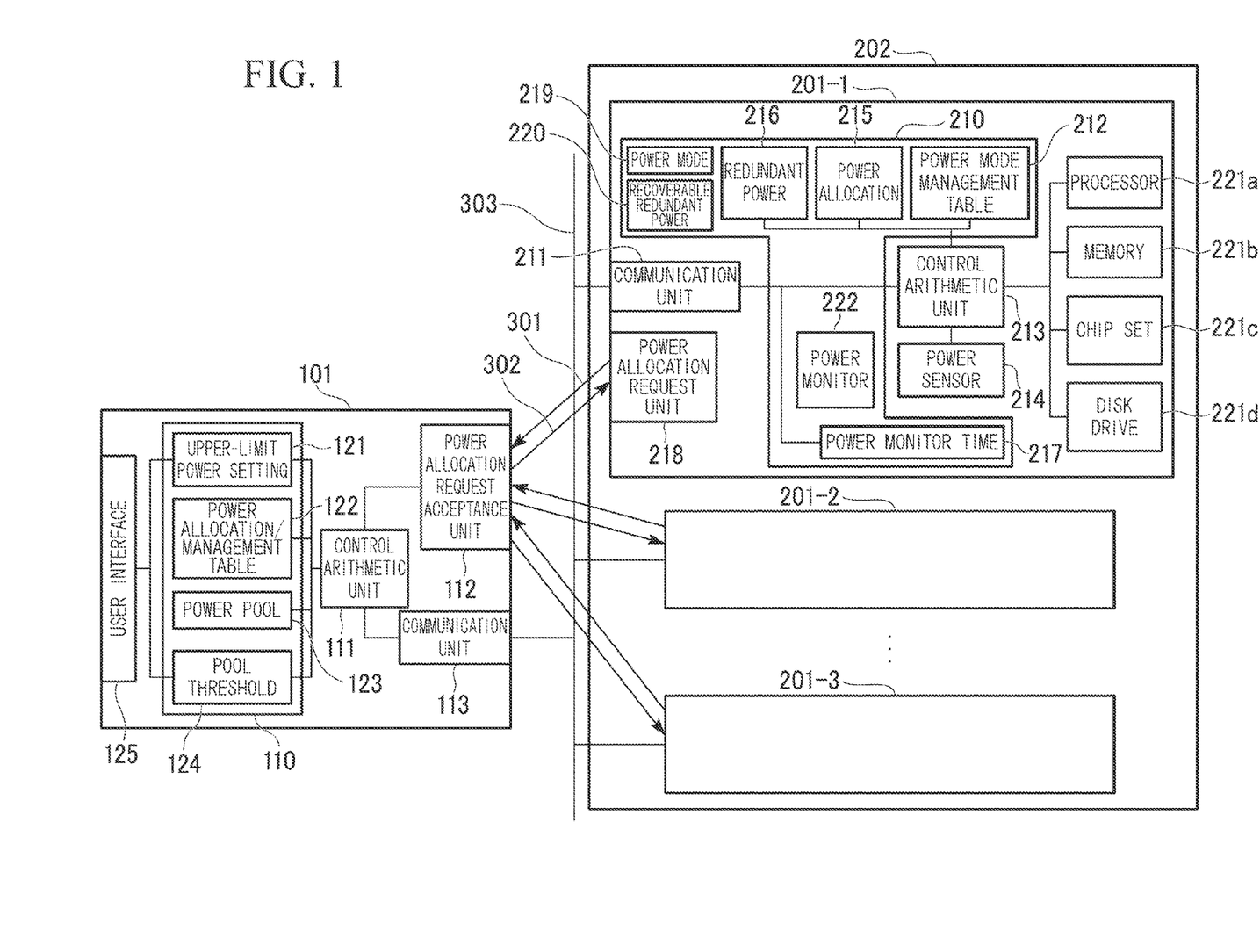
FIG. 1 is a block diagram showing the constitution of a power distribution system including a management module and a plurality of servers in accordance with a preferred embodiment of the present invention.

FIG. 1 is a block diagram showing the constitution of a power distribution system according to a preferred embodiment of the present invention. The power distribution system of FIG. 1 includes a management module 101 connected to a plurality of servers 201-1, 201-2, 201-3, . . . (simply, referred to as servers 201). The management module 101 and the servers 201 are each configured using a computer, for example. The management module 101 manages power consumption with regard to the servers 201. The servers 201 are aggregated together as a server group 202. The management module 101 is connected to each server 201 via a power allocation request line 301 and a power allocation response line 302. The management module 101 and the servers 201 are all connected to a network 303.

The management module 101 is constituted of a storage unit 110, a control arithmetic unit 111, a power allocation request acceptance unit 112, a communication unit 113 and a user interface 125. The storage unit 110 stores an upper-limit power setting 121, a power allocation/management table 122, a power pool 123, and a pool threshold 124. The storage unit 110 is constituted of a memory, a hard-disk unit, and the like. The control arithmetic unit 111 is configured of a CPU, for example.

The power allocation/management table 122 records power allocations to the servers 201. The upper-limit power setting 121 indicates the upper-limit value of power allocated to the server group 202 in total. The management module 101 allows the user to freely modify the upper-limit power setting 121 via the user interface 125.

The management module 101 allocates power to the servers 201 within the upper-limit power setting 121. The management module 101 manages power allocations to the servers 201 with reference to the power allocation/management table 122. The sum of power allocations to the servers 201 cannot exceed the upper-limit power setting 121. The difference between the upper-limit power setting 121 and the sum of power allocations is defined as the power pool 123. When the power pool 123 becomes lower than the pool threshold 124, the management module 101 recovers a redundant power.

Each server 201 is constituted of a storage unit 210, a communication unit 211, a control arithmetic unit 213, a power sensor 214, and a power allocation request unit 218. Each server 201 includes power-consuming components such as a processor $221a$, a memory $221b$, a chip set $221c$, and a disk drive $221d$. These components can be limited in performance in response to a power mode change instruction from the control arithmetic unit 213, so that they can consume limited power sufficing limited performance. The power sensor 214 normally monitors actual power consumption of each server 201.

The storage unit 210 records a power mode management table 212, a power allocation 215, a redundant power 216, a power monitor time 217, a power mode 219, a recoverable redundant power 220, and a power monitor value 222. The storage unit 210 is constituted of a memory, a hard-disk unit, and the like. The control arithmetic unit 213 is configured of a CPU, for example.

The power mode management table 212 records a maximum power at each power mode, an upper mode request threshold, and a mapping involved in performance-limiting factors of components. In the server 201, the power monitor value 222 does not exceed the maximum power at one mode. When the power monitor value 222 exceeds the upper mode request threshold at one mode, the server 201 is shifted from one mode to the upper mode, thus requesting an additional power allocation.

Figure 2:
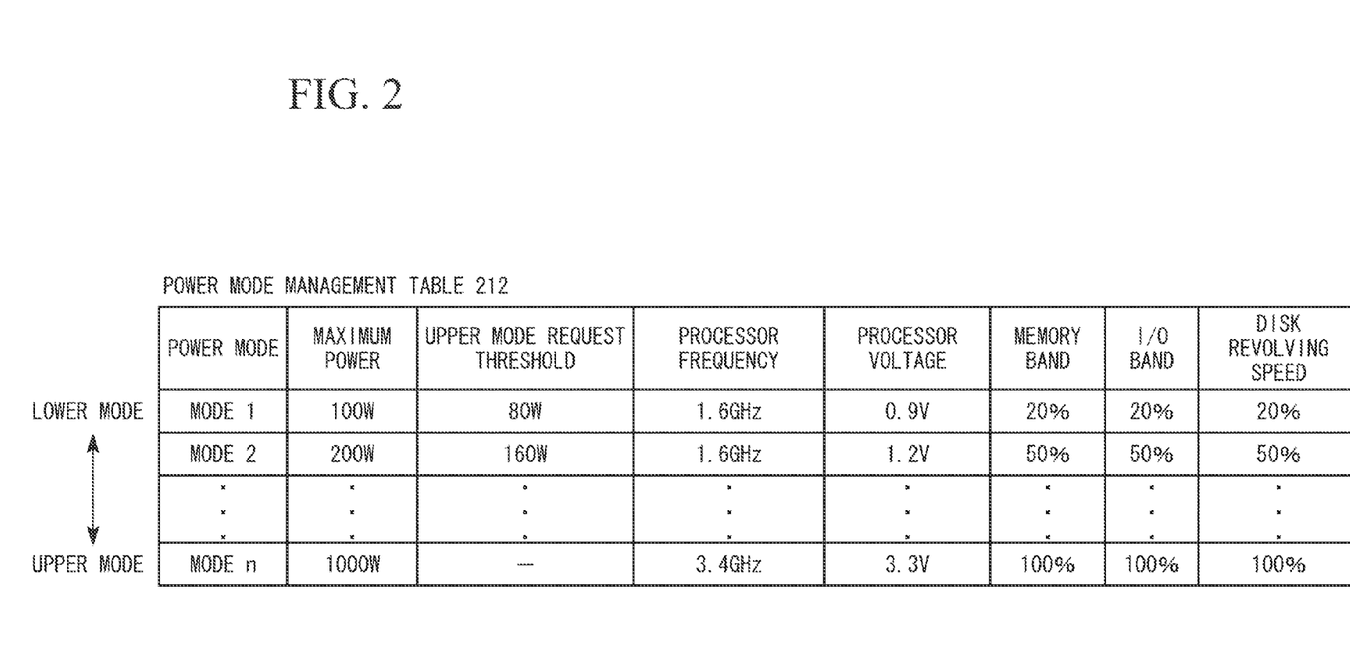
FIG. 2 shows the details of a power mode management table included in each server whose power allocation is managed by the management module.

FIG. 2 shows the details of the power mode management table 212, which describes a plurality of power modes (i.e. Mode 1, Mode 2, . . . , Mode n) in connection with each server 201. Upper modes need higher power consumption, while lower modes need smaller power consumption. The power allocation/recovery is achieved by changing the power mode of each server 201. Each mode stipulates the maximum power; hence, each server 201 operates so as not to exceed the maximum power at each mode. This operation is implemented by mapping performance-limiting factors of components in connection with power modes. Herein, each component is controlled to operate with the preset performance-limiting factor at each mode. The relationship between the mapping and the maximum power is actually measured in advance.

The power mode management table 212 records the upper mode request threshold as well. When the power monitor value 222 exceeds the upper mode request threshold, each server 201 being shifted from one mode to the upper mode requests the management module 101 to designate an additional power allocation.

Each server 201 has the "private" power sensor 214 for measuring the entire power consumption thereof. Through monitoring the actual power consumption of each server 201 within the power monitor time 217, the power sensor 214 detects the maximum power as the power monitor value 222. It is possible to eliminate the power monitor time 217 so that each server 201 detects the actually monitored power consumption as the power monitor value 222, which is recorded in the storage unit 210. In addition, the storage unit 210 records the power allocation 215 which is designated for each server 201 by the management module 101. The management module 101 allows the user to arbitrarily modify the power monitor time 217 recorded in the storage unit 210 within a certain range.

Figure 3:
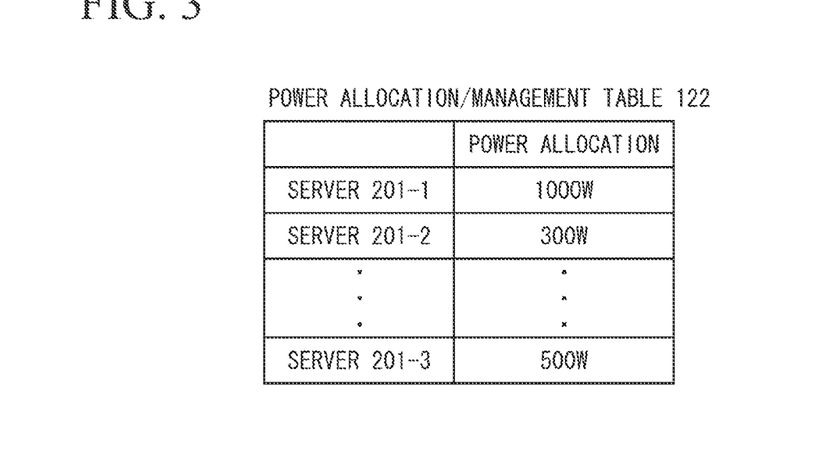
FIG. 3 shows the details of a power allocation/management table included in the management module.

FIG. 3 shows the details of the power allocation/management table 122, which records power allocations with respect to the servers 201.

Figure 4:
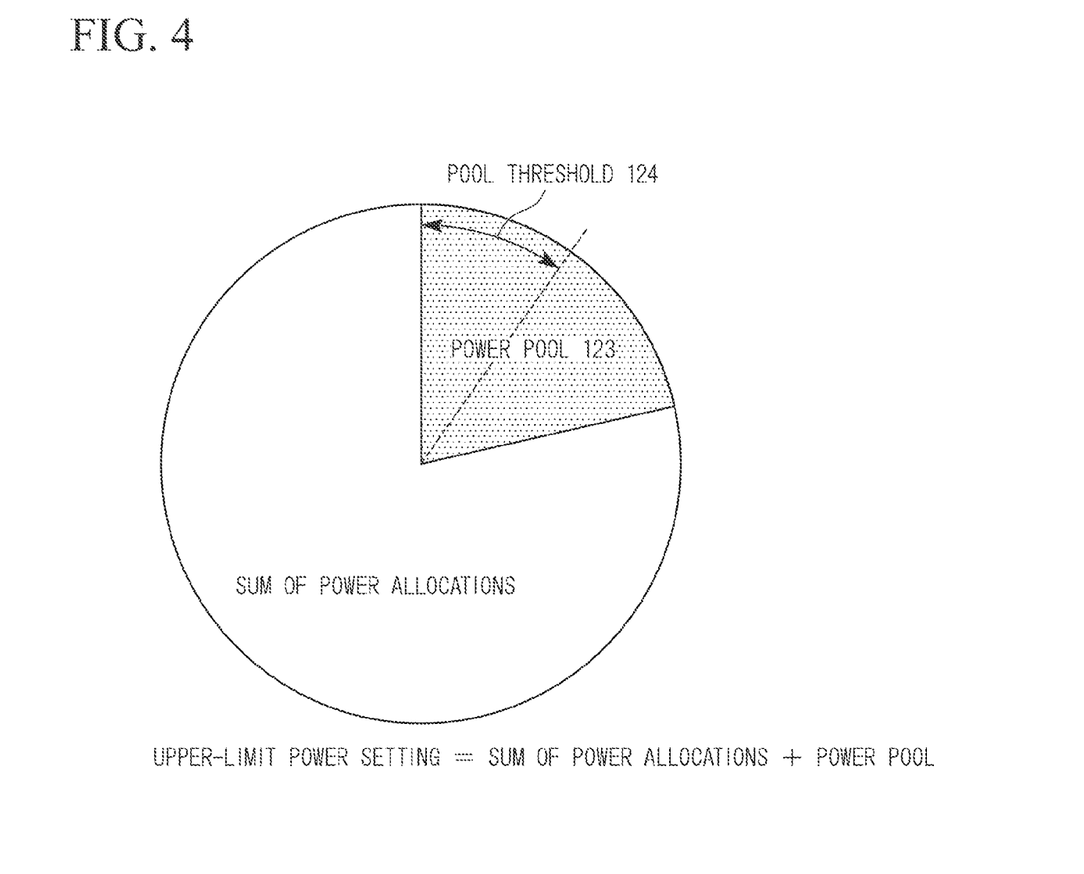
FIG. 4 is a graph showing the relationship between the power pool and the sum of power allocations to servers.

FIG. 4 shows the relationship between the upper-limit power setting 121, the power pool 123, and the sum of power allocations to the servers 201. The remainder calculated by subtracting the sum of power allocations from the upper-limit power setting 121 corresponds to the power pool 123. When the power pool 123 becomes lower than the pool threshold 124, the management module 101 requests the servers 201 to recover redundant power.

The power allocation request unit 218 of each server 201 is connected to the power allocation request acceptance unit 112 of the management module 101 via the 1-bit power allocation request line 301 and the 1-bit power allocation response line 302. A power allocation request signal is sent from the server 201 to the management module 101 via the power allocation request line 301, while a power allocation response signal is sent from the management module 101 to the server 201 via the power allocation response line 302. The present embodiment achieves high-speed power allocation using the power allocation request line 301 and the power allocation response line 302. In order to achieve high-speed processing of power allocation, the power allocation request acceptance unit 112 and the power allocation request unit 218 are configured using optimal combinations of electronic circuits. In this connection, the power allocation response line 302 can be configured of multiple bits.

The management module 101 and the server 201 are able to communicate with each other by use of the communication units 113 and 211 installed therein.

It is possible to arrange a plurality of management modules (instead of a single management module 101), thus achieving a certain redundancy in managing power allocations to servers. Even when one management module is down, another management module compensates for its function so as to continue processing in managing power allocations to servers.

Alternatively, it is possible to select one of the servers 201 as a management module. Herein, the selected server 201 serving as the management module performs power management on the server group 202 thereof.

The present embodiment does not necessarily perform power management on the servers 201; that is, it is able to perform power management on other information processing apparatuses such as storage devices and switching devices. That is, the application of the present embodiment can be expanded to handle any types of information processing apparatuses having mechanisms for establishing transactions regarding power allocations via the power allocation request line 301, the power allocation response line 302, and the network 303.

Figure 5:
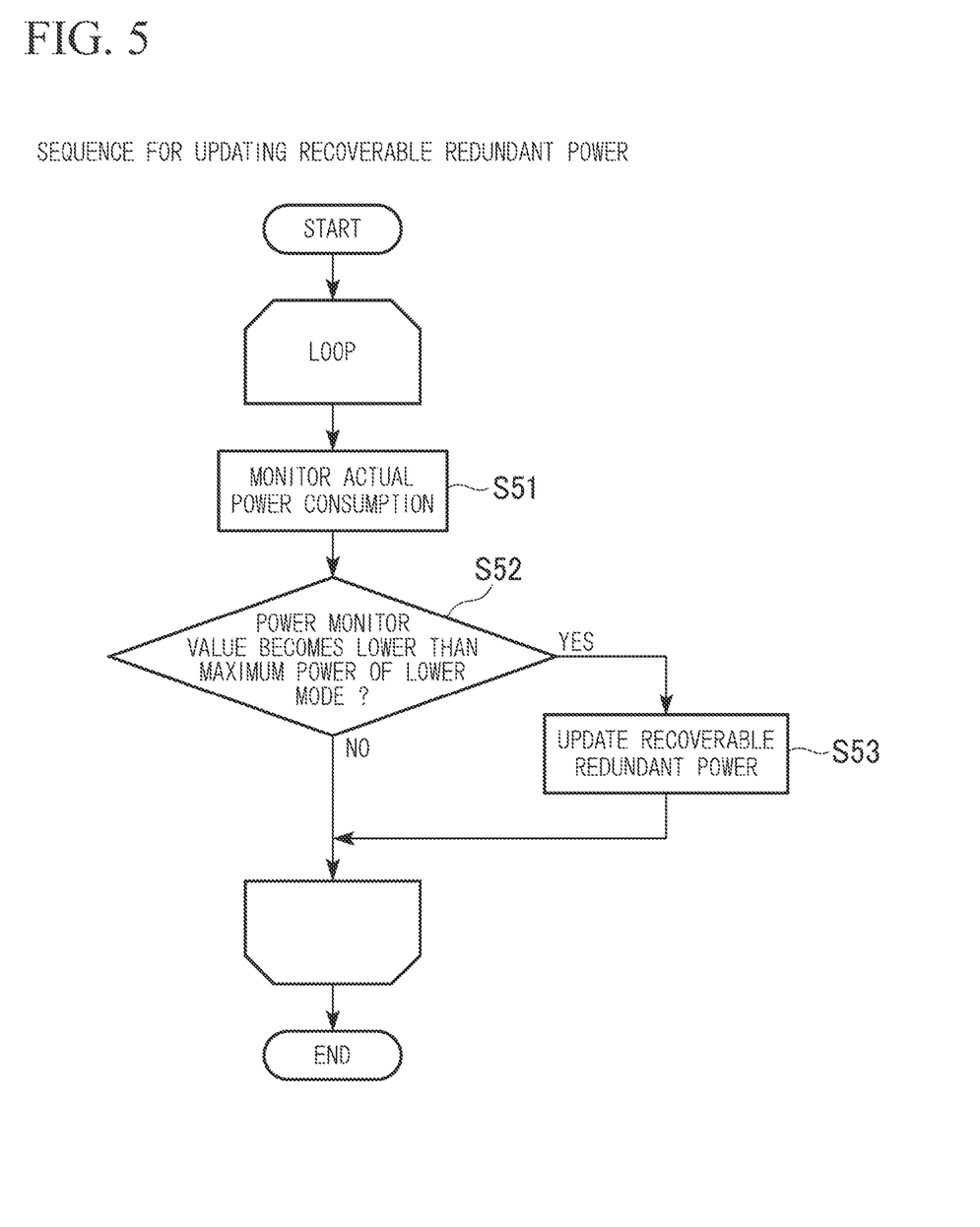
FIG. 5 is a flowchart showing a sequence for updating recoverable redundant power.

FIG. 5 shows a sequence for updating the recoverable redundant power 220 in the server 201. In step S51, the power sensor 24 monitors the actual power consumption during the power monitor time 217 so as to detect the maximum value as the power monitor value 222. At this time, the redundant power 216 is calculated by subtracting the power monitor value 222 from the power allocation 215. When the server 201 determines in step S52 that the power monitor value 222 is lower than the maximum power of a lower mode lower than the "present" power mode 219, the flow proceeds to step S53 in which the recoverable redundant power 220 is calculated by subtracting the maximum power of the lower mode from the power allocation 215 (corresponding to the maximum power of the present power mode 219). The server 201 repeats the above procedure.

The power monitor time 217 is determined to suit the type of job executed by each server 201. In the case of a database server having small power variations, for example, the power monitor time 217 is increased so as to prevent power from being frequently recovered due to sensitive response to small power variations. In the case of a WEB server, the power monitor time 217 is decreased so as to efficiently recover power.

Figure 6:
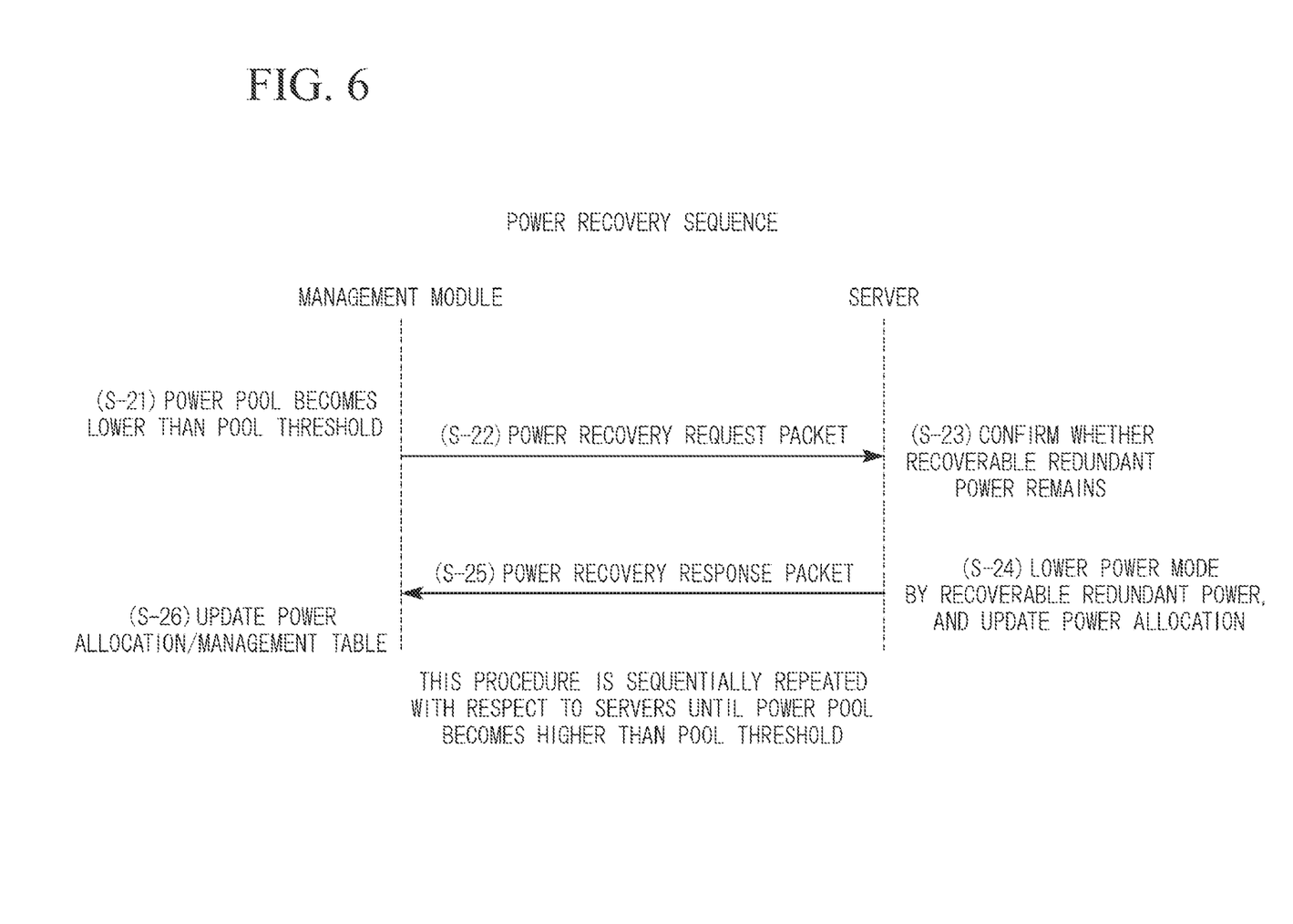
FIG. 6 shows a power recovery sequence in which the management module recovers a redundant power from the server.

FIG. 6 shows a power allocation request sequence which is initiated when the management module 101 recovers a redundant power from the server 201. When the power pool 123 becomes lower than the pool threshold 124, the management module 101 makes a redundant power recovery request to the server 201 in step S-21. That is, the management module 101 issues a power recovery request packet toward the server 201 via the network 303 in step S-22.

The server 201 periodically updates the recoverable redundant power 220 based on the power monitor value 222 (indicating the actual power consumption) and the power allocation 215 ascribed to the present power mode 219.

Upon receiving the power recovery request packet, the server 201 confirms whether or not the recoverable redundant power 220 remains therein in step S-23. When the recoverable redundant power 220 remains, the server 201 changes the power mode 219 to a lower mode whose maximum power matches a reduction of the recoverable redundant power 220, thus correspondingly updating the power allocation 215 in step S-24. Then, the server 201 sends back a power recovery response packet including the information of the recoverable redundant power 220 to the management module 101 in step S-25. Upon receiving the power recovery response packet, the management module 101 updates the power allocation described in the power allocation/management table 122. That is, the management module 101 reduces the previous power allocation by the recoverable redundant power 220 with respect to the server 201 while increasing the power pool 123 by the recoverable redundant power 220.

The management module 101 sequentially requests the servers 201 to recover power until the power pool 123 exceeds the pool threshold 124. If the power pool 123 does not exceed the pool threshold 124 even when all the redundant power is recovered from the servers 201, the management module 101 continues to periodically request the servers 201 to recover power.

The redundant power is not necessarily recovered at once from each server 201; that is, it is possible to recover power from the server 201 at multiple times. In this case, the server 201 receiving a power recovery request packet from the management module 101 informs the management module 101 of a part of the recoverable redundant power 220. Upon receiving a power recovery response packet indicating a part of the recoverable redundant power 220 from the server 201, the management module 101 continues sequentially requesting the servers 201 to recover power.

Figure 7:
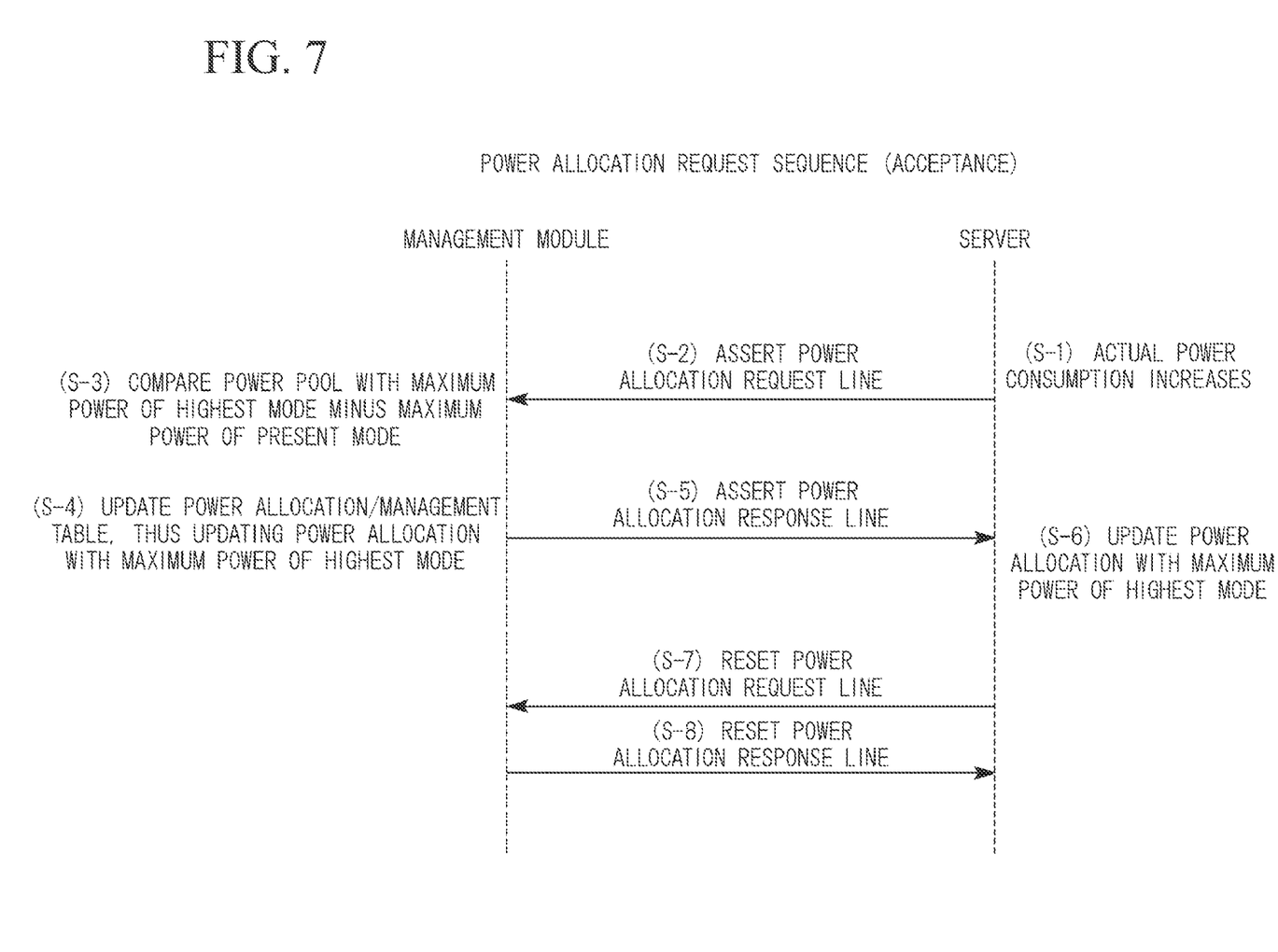
FIG. 7 shows an acceptance mode of a power allocation request sequence in which the management module accepts a power allocation request made by the server.

FIG. 7 shows an acceptance mode of a power allocation request sequence. In the server 201, the power sensor 214 normally monitors the actual power consumption so as to update the power monitor value 222. In step S-1, when the actual power consumption increases so as exceed the upper mode request threshold, the server 201 makes a power allocation request to the management module 101. In step S-2, the server 201 asserts the power allocation request line 301 connected to the management module 101. At the same time, the server 201 sends the information regarding the maximum power of the highest mode to the management module 101.

In step S-3, the management module 101 calculates the difference between the maximum power of the highest mode and the maximum power of the present power mode 219 (i.e. the power allocation 215); then, it compares the difference with the power pool 123. When the power pool 123 is larger than the calculated difference, the management module 101 makes an additional power allocation to the server 201.

In step S-4, the management module 101 updates the power allocation, which is described in the power allocation/management table 122 with respect to the server 201, with the maximum power of the highest mode. In step S-5, the management module 101 asserts the power allocation response line 302 connected to the server 201 since it acknowledges the power allocation request made by the server 201. At this time, the management module 101 subtracts a decrement (corresponding to an increment of the power allocation to the server 201) from the power pool 123. In step S-6, the server 201 raises the power mode 219 to the highest mode in response to the asserting of the power allocation response line 302, wherein the server 201 updates the power allocation 215 with the maximum power of the highest mode in the storage unit 210. In step S-7, the server 201 resets the power allocation request line 301. In step S-8, the management module 101 correspondingly resets the power allocation response line 302.

Figure 8:
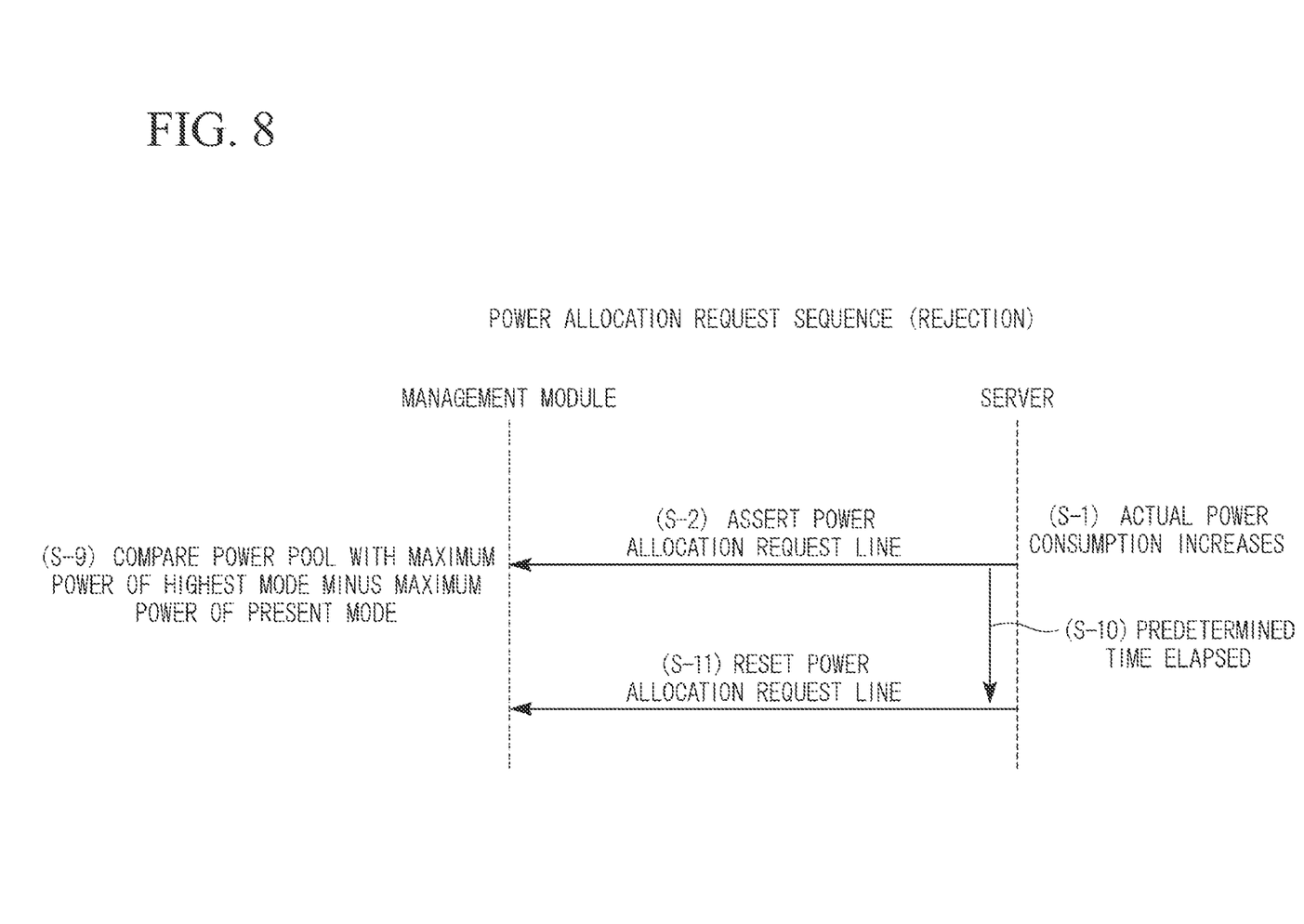
FIG. 8 shows a rejection mode of the power allocation request sequence in which the management module rejects the power allocation request made by the server.

FIG. 8 shows a rejection mode of the power allocation request sequence, wherein the server 201 executes the steps S-1 and S-2 similarly to the acceptance mode of FIG. 7. In step S-9, the management module 101 compares the power pool 123 with the difference between the maximum power of the highest mode and the power allocation 215 of the present power mode 219 in the server 201. When the power pool 123 is lower than the difference, the management module 101 is unable to make an additional power allocation to the server 201. In this case, the management module 101 does not assert the power allocation response line 302 since it rejects the power allocation request made by the server 201. Since the management module 101 does not assert the power allocation response line 302 in a lapse of a predetermined time (see step S-10), the server 201 determines that the power allocation request is rejected by the management module 101; thus, the server 201 resets the power allocation request line 301 in step S-11.

When the management module 101 acknowledges a plurality of power allocation request lines 301 being simultaneously asserted by the servers 201, the management module 101 makes an additional power allocation to the designated server 201 in light of the redundancy of the power pool 123.

Using the power allocation response line 302 consisting of multiple bits, the management module 101 is able to cope with an additional power allocation even when the power allocation to the server 201 cannot be increased up to the maximum power of the highest mode, wherein the power mode 219 of the server 201 may be raised by one level, for example. For instance, when the power allocation response line 302 consists of three bits, a decimal value "0" of three-bit data is used to indicate "reset", while "1" to "7" are used to indicate seven levels of power mode. This allows the management module 101 to arbitrarily select seven levels of power mode when increasing the power allocation to the server 201.

The present invention has a variety of industrial applications as follows:

(1) Blade Server System

The package management module of the blade server system carries the function of the management module 101, wherein the entire package is regarded as the server group 202, and power management is performed such that the entire power consumption of the package does not exceed the predetermined power. Herein, the backplane of the package can serve as the power allocation request line 301.

(2) Rack Server System

The present invention can be implemented to control servers installed in racks of the rack server system by way of the rack management module, wherein the backplane or cable can serve as the power allocation request line 301. In addition, the present invention can be implemented to control the total power of the blade server packages installed in racks.

Lastly, it is apparent that the present invention is not limited to the above embodiment, but may be modified and changed without departing from the scope and spirit of the invention.

What is claimed is:

1. In a power distribution system in which a plurality of information processing apparatuses, undergoing fluctuations of power consumption and performance owing to a power mode being set, is connected to a management module, for allocating power to the plurality of information processing apparatuses, via a network,
said power distribution system characterized in that when the information processing apparatus needs surplus power allocation, the information processing apparatus sends a power allocation request to the management module so that the management module sends back a power allocation response to the information processing apparatus via a communication line,
wherein the management module includes a first control calculation unit and a first storage unit,
wherein the first storage unit stores an allocated power management table, which describes an upper-limit value of power entirely allocated to the plurality of information processing apparatuses and an allocated power allocated to each information processing apparatus, and a power pool unallocated to any one of the information processing apparatuses,
wherein the information processing apparatus includes a power sensor measuring real power consumption, a second control calculation unit, and a second storage unit,
wherein the second storage unit stores the power mode, a power mode management table describing a maximum power value for each power mode and an upper mode request threshold for requesting transition to an upper power mode, the allocated power, and redundant power, wherein the second control calculation unit calculates the redundant power based on a difference between the allocated power and the real power consumption, thus updating the redundant power stored in the second storage unit, wherein the first control calculation unit collects the redundant power and adds it to the power pool, wherein when the information processing apparatus requests additional power allocation, the first control calculation unit allocates a part of or the entirety of the power pool to the information processing apparatus, wherein the second control calculation unit changes the power mode in response to the allocated power, wherein the first storage unit stores a pool threshold representing a lower-limit value of the power pool, and wherein the first control calculation unit collects the redundant power only when the power pool is below or equal to the pool threshold.

2. The power distribution system according to claim 1, wherein the communication line is configured of a plurality of bits.

3. The power distribution system according to claim 1, wherein the power sensor measures real power consumption during a predetermined power monitor time, and wherein the second control calculation unit detects a power monitor value corresponding to a maximum value within the real power consumption measured during the predetermined power monitor time, thus calculating the redundant power based on a difference between the allocated power and the power monitor value.

4. A power distribution method for allocating power to a plurality of information processing apparatuses undergoing fluctuations of power consumption and performance owing to a power mode being set, said power distribution method characterized by comprising the steps of:

storing an allocated power management table, describing an upper-limit value of power entirely allocated to the plurality of information processing apparatuses and an allocated power allocated to each information processing apparatus, and a power pool unallocated to any one of the information processing apparatuses;

storing the power mode, a power mode management table, describing a maximum power value for each power mode and an upper mode request threshold for requesting transition to an upper power mode, the allocated power, and redundant power;

calculating the redundant power based on a difference between the allocated power and real power consumption, thus updating the stored redundant power;

collecting the redundant power and adding it to the power pool;

allocating a part of or the entirety of the power pool to the information processing apparatus when the information processing apparatus requests additional power allocation via communication line;

changing the power mode in response to the allocated power via the communication line; and storing a pool threshold representing a lower-limit value of the power pool, wherein the redundant power is collected only when the power pool is below or equal to the pool threshold.

* * * * *